United States Patent [19]

Male et al.

[11] 3,787,632

[45] Jan. 22, 1974

[54] AUTOMATIC NUMBER IDENTIFICATION FOR PRIVATE TELEPHONE EXCHANGES

[75] Inventors: Charles Colin Male, Stittsville; John Melvin Wallis, Hazeldean, both of Ontario, Canada

[73] Assignee: Northern Electric Company Limited, Montreal, Quebec, Canada

[22] Filed: June 28, 1971

[21] Appl. No.: 157,344

[52] U.S. Cl. .......... 179/18 FH

[51] Int. Cl. .......... H04q 3/72

[58] Field of Search ....... 179/18 FH, 18 AD, 27 DB

[56] References Cited

UNITED STATES PATENTS

| | | | |
|---|---|---|---|
| 3,188,395 | 6/1965 | Blashfield | 179/18 FH X |
| 3,364,310 | 1/1968 | Joel, Jr. | 179/18 FHX |
| 2,963,553 | 12/1960 | White | 179/18 FH |
| 2,924,666 | 2/1960 | Brooks et al. | 179/18 FH |

*Primary Examiner*—Thomas W. Brown
*Attorney, Agent, or Firm*—Sidney T. Jelly

[57] ABSTRACT

An automatic number identification system for identifying the calling station of a branch telephone exchange and transferring the information via the normal talking path connection through the central office. Briefly, the invention provides for the connection of the calling station to the central office for the dialling of a called number; disconnection of the station after the called number is transmitted to the central office; connection of the calling station identification apparatus to the central office for transmission of the calling station identity; followed by disconnection of the identification apparatus and reconnection of the calling station. Various alternative arrangements are described for adapting the invention to the various switching systems, accounting systems and whether "ground" or "loop" start is used.

6 Claims, 14 Drawing Figures

AUTOMATIC NUMBER IDENTIFICATION FOR PRIVATE TELEPHONE EXCHANGES

This invention relates to the automatic identification of a calling station of a branch telephone exchange for accounting purposes.

There exist private branch exchanges (PBX) called CENTREX in which all the stations have their own seven digit number. When a station of such an exchange dials a long-distance or toll call, the central office will not be made aware of the identification of the originating station, but only of the originating PBX. It is usual therefore to cause such calls to be passed to an operator who requests identification of the calling station. After this information is passed to the central office for accounting purposes, the call proceeds in the normal manner.

One system is available for identifying a calling station in an arrangement as described above, and for forwarding the information to the central office. The system requires two complete physical connections, between the PBX and the central office, in order to identify the calling station, process the data to the accounting equipment, and to make the voice connection. The two connections are (1) the talking path, and (2) a dedicated and shared data link. There is also required, at the central office, equipment for receiving the identification information from the PBX, storing and translating this information, and for forwarding the information to the automatic accounting equipment for providing automatic number identification of the station making a call.

The present invention provides for the automatic number identification of the calling station by equipment at the private automatic branch exchange (PABX), and transferring the information via the normal talking path connection through the CO. The CO, having had related minor modifications, steers the information directly to the automatic accounting equipment. Since the information in effect is transferred direct to the accounting equipment, receiving, storing, translating and forwarding equipment is not required at the central office. While some alterations to the equipment at the central office, and at the PABX, are required, these are not extensive and there is a reduction (possibly considerable for some switching systems) in the cost per line. There is also some increase in capacity in that the second physical connection between the PABX and central office -the dedicated and shared data line- is not required.

Thus, in accordance with the present invention there is provided apparatus for private branch exchange automatic number identification, for use with a single line connection, comprising; an automatic number identification circuit at the private automatic branch exchange for identifying the calling station; means for disconnecting the private automatic branch exchange station from the line after the called number is transmitted to the central office; means for connecting the automatic number identification circuit at the private automatic branch exchange to the line and for transmitting the identified calling number to the accounting equipment; means for disconnecting the private automatic branch exchange automatic number identification circuit from the line after transmission of the identified calling number, and reconnecting the private automatic branch exchange station to the line for normal call progression.

At various places in the description certain abbreviations, contractions and acronyms are used. A list of these abbreviations, contractions and acronyms as they occur in text follows with a brief expansion and/or explanation for each one.

PBX - Private Branch Exchange - a type of service offering or a machine.
PABX - Private Automatic Branch Exchange - a machine.
ANI - Automatic Number Identification.
PBX-ANI - Private Branch Exchange - Automatic Number Identification - a class of service, the ANI equipment at the PABX, the name of certain contacts in the accompanying circuits.
CO - Central Office.
T&R - Tip and Ring leads.
AIOD - Automatic Identified Outward Dialling - a service feature, equipment.
SI(F) - Station Identification (Frame).
AMA - Automatic Message Accounting.
CO-ANI - Automatic Number Identification provided at the CO.
CAMA - Centralized Automatic Message Accounting.
LAMA - Local Automatic Message Accounting.
MF - Multi-frequency.
BC - "Battery control" - relay and contacts.
AUP - "ANI-Up" - relay and contacts.
DND - "Digit Nine Dialled" - contacts.
DOPC - "Digits Outpulsing Complete (called number)" (transmitted from CO to CAMA) - contacts.
OPC - "Outpulsing Complete (calling number)" - contacts.
REQ - "Request" - contact and relay.
LDOC - "Last (called) Digit Outpulsed to CAMA" - contacts.
MDF - Main Distributing Frame.
ANI-CAMA CO - a No. 5 Crossbar CO arranged for CAMA.
LLF - Line link frame.
JCTRS - Junctors.
TLF - Trunk link frame.
CTSD - "Cut Through and Sender Drop" - relay and contacts.
LAMA-CO - a No. 5 Crossbar CO arranged for LAMA.
DDD - Direct Distance Dialling.
CDTT - "Called Digits Transferred to the Transverter" - contacts.
STC - "Sender Transfer (of called number) Complete" - relay and contacts.
DAS - "Digit Absorbing Start" - contacts.
LDTV - "Last Digit from Transverter (calling number)" - relay and contacts.
LDA - "Last Digit Acknowledged (calling number)" - contacts.
DRS - "Digits (on calling number line location) Received from Sender" - relay and contacts.
LDRX - "Last Digit (from PBX-ANI) Received" - contacts.
ORL - Originating Register Link.
ORS - Originating Register Sender.
SXS - Step by step switching system.

The invention will be understood by the following description of certain embodiments, for differing systems, by way of example, in conjunction with the accompanying diagrammatic drawings, in which.

Figure 1:
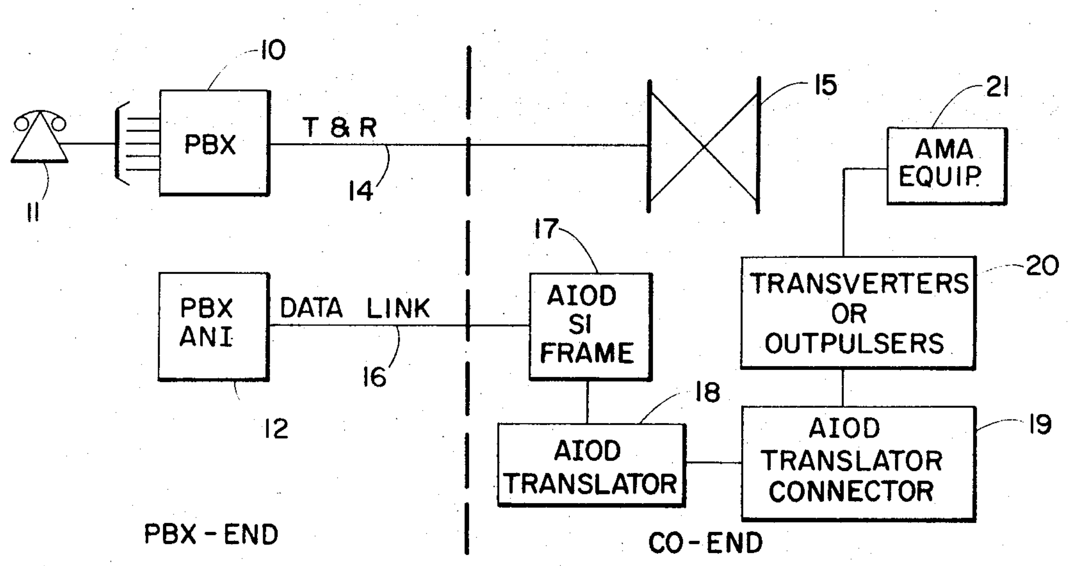
Fig. 1 PRIOR ART
FIG. 1 is a block diagram of an existing system.

FIG. 1 illustrates an existing system for a private branch exchange (PBX) 10 in which the terminating stations 11, each have their own 7-digit calling number and in which an automatic number identification circuit (PBX-ANI) 12 is provided for providing calling number identification. The PBX 10 is connected to the central office by one or more tip and ring (T&R) lines 14 in the normal manner. The switching equipment for the call progression at the central office (CO) is indicated at 15.

The PBX-ANI 12 is connected to special equipment at the central office by a data link 16. The special equipment at the Central Office comprises an Automatic Identified Outward Dialing (AIOD) Station Identification (SI) frame 17, an AIOD translator 18, an AIOD translator connector 19, and transverters or outpulsers 20, connected to the Automatic Message Accounting (AMA) equipment 21. All of the items referred to are standard equipment, of well known form and do not require further detailed description.

Figure 2:
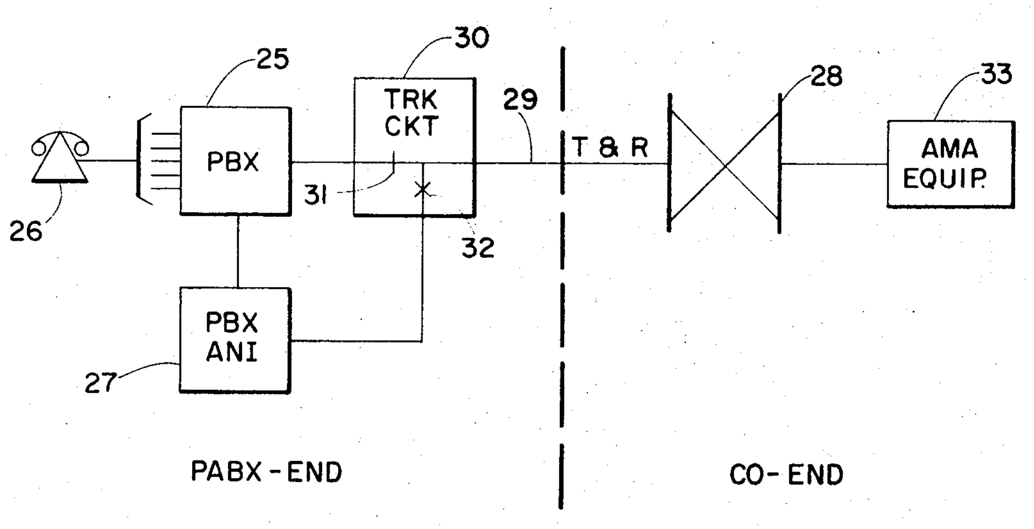
FIG. 2 is a block diagram of the system of the present invention.

FIG. 2 illustrates, in general outline, a system according to the present invention. The PABX 25 corresponds to the PBX 10 of FIG. 1, and has stations 26, each of which has its own 7-digit number. A PBX-ANI 27 is provided at the PABX 25 and serves to store and forward the calling station identification, again as in FIG. 1. However, in the system illustrated in FIG. 2, there is not a separate data link between the PBX-ANI 27 and the central office as in FIG. 1. In the present invention, the PABX 25 is connected to the central office switching equipment indicated at 28, via one or more T&R lines 29 and a trunk 30. Trunk 30 serves to connect either the PABX 25 or the PBX-ANI 27 to the T&R line 29 and thus to the central office switching equipment 28, by means of contacts 31 and 32. The central office also is connected to AMA equipment 33.

It will be seen from a comparison of FIGS. 1 and 2 that the invention enables a considerable amount of equipment at the central office to be dispensed with, while requiring the addition of only a small amount of equipment at the PABX location. Some minor alterations and additions will also be required at the central office, as will be apparent later, but these should be simple and inexpensive compared to the system presently available.

A general description of the operation of the system, as illustrated in FIG. 2, is as follows. When a PABX station user dials 9 for a central office call the PBX-ANI 27 automatically stores the calling station number. If the station user then dials a chargeable call, the central office equipment will recognize from the special PBX-ANI class of service that the Central Office Automatic Number Identification (CO-ANI) equipment will not be required on this particular call. The called number is outpulsed from the central office to the toll office in the normal fashion. On completion of transmission of the called number, the central office signals to the PABX 25 to temporarily remove the calling station 26 from the trunk 30 and replace it by the PBX-ANI equipment 27.

Simultaneously, the central office sender is dropped and supervision is placed under the control of the outgoing automatic message accounting trunk. This action causes the central office to become basically transparent between the message accounting equipment 33 and the PBX-ANI equipment 27.

When the AMA equipment 33 makes its request for the calling number, this request or a relayed signal of the request passes back through the transparent office to the PBX-ANI 27. The request causes the PBX-ANI 27 to outpulse the stored information on the calling station 26. At completion of outpulsing the PBX-ANI 27 is dropped from, and the station 26 returned to, the trunk 30. The calling number information goes directly to the AMA equipment 33 and normal call progression follows.

The functional sequence of the PBX-ANI will vary, depending upon whether ground start or loop start is used and on whether CAMA or LAMA accounting system is used. The functioning must also be compatible with existing systems. A general function sequence for a PBX-ANI system in accordance with the present invention, with ground start, is as follows.

Lift receiver, the Tip and Ring conditions in the CO before the calling station dials digit 9 are battery on the Ring in the Co and Tip open in CO; station dials digit 9, PABX and CO Tip and Ring conditions after station dials digit 9 are: ground is inserted on the Ring in the PABX which produces a seize signal for the CO, which in turn grounds the Tip in the CO with battery already on the Ring in the CO, ground remains on Tip and battery remains on Ring in CO; the PABX is made "transparent",; the CO gives dial tone, indicating it is ready to accept dialled digits; ground is removed from the Ring in the PABX; the PABX station dials the access code; the CO recognizes that the PBX-ANI class of service is required; the CO recognizes that Automatic Message Accounting is required by the activation of the PBX-ANI class of service; the rest of the called digits are dialled and transmitted to the CO; the called digits are stored in the CO register; the CO equipment determines the calling line location; an outgoing trunk is seized; connections through the CO are made; the sender (or transmitter) outpulses the called number to the connecting CO. There are then two alternative paths depending on accounting systems - for CAMA, the sender (or transmitter) begins to transmit the called number to the CAMA equipment - for LAMA, the sender begins to transfer the called number to the LAMA transverter. The sequence then resumes - Battery is removed or reversed from the PBX-CO Ring connection at the CO; this signals the PABX that the PABX station is to be dropped from the line and the PBX-ANI simultaneously inserted into the line at the PABX; supervision is placed under the control of the outgoing trunk in the CO; the outgoing trunk becomes transparent; the Message Accounting equipment sends out a request signal for the data on the calling station; the request signal is repeated to the PABX by reinserting or re-reversing the battery on the Ring in the CO; reinsertion or re-reversal of battery on the Ring in the CO causes PBX-ANI to MF outpulse the calling station number; completion of MF outpulsing causes return of the PBX station to the line and simultaneous removal of the PBX-ANI from the line. Again there are then two alternative paths - for CAMA, the calling digits are received by the CAMA equipment and are processed to complete the billing - for LAMA, the calling digits are received by the LAMA PBX-MF-Receiver; the digits are changed to 2-out-of-5 code and passed to the transverter, and then the digits are processed to complete the billing; the sequence then resumes at this point, for both CAMA and LAMA, in that normal call progression continues.

For loop start the general function sequence is as follows:

lift receiver, the Tip and Ring conditions in the CO before the calling station dials the digit 9 are battery is on the Ring in CO, Ground is on Tip in CO, Loop is open at the PABX; the station dials the digit 9 causing the Loop-make contacts to be closed and a seize signal to be produced; the CO Tip and Ring conditions after the station dials the digit 9 are: ground remains on Tip and battery remains on Ring in CO; the PABX is made transparent between the station and the CO; the CO gives dial tone indicating it is ready to accept dialled digits; the access code is dialled; the CO recognizes that the PBX-ANI class of service is required; the CO recognizes that Automatic Message Accounting is required by the activation of the PBX-ANI class of service; the rest of the called digits are dialled and transmitted to the CO; a relay follows the dial pulses and repeats them into the CO; the called digits are stored in the CO register; the CO equipment determines the calling line location; an outgoing trunk is seized; connections through the CO are made; the sender (or transmitter) outpulses the called number to the connecting CO. There are then two alternative paths depending upon the accounting system - for CAMA, the sender (or transmitter) begins to transmit the called number to the CAMA equipment - for LAMA, the sender begins to transfer the called number to the LAMA transverter. The sequence then resumes - Battery is removed or reversed from the PBX-CO Ring connection at the CO; this signals the PABX that the PABX station is to be dropped from the line and the PBX-ANI simultaneously inserted into the line at the PABX; supervision is placed under the control of the outgoing trunk in the CO; the outgoing trunk becomes transparent; the Message Accounting equipment sends out a request signal for the data on the calling station; the request signal is repeated to the PABX by reinserting or re-reversing the battery on the Ring in the CO; reinsertion or re-reversal of battery on the Ring in the CO causes the PBX-ANI to MF outpulse the calling station number; completion of MF outpulsing causes the return of the PBX station to the line and the simultaneous removal of the PBX-ANI from the line. Again there are two alternative paths - for CAMA, the calling digits are received by the CAMA equipment and are processed to complete the billing - for LAMA, the calling digits are received by the LAMA PBX-MF-Receiver; the digits are changed to 2-out-of-5 code and passed to the transverter, and then the digits are processed to complete the billing; the sequence then resumes at this point, for both CAMA and LAMA, in that normal call progression continues.

CO TO PABX SIGNALLING METHODS AND CALL START CONSIDERATIONS

In the various systems, in accordance with the present invention, signalling will take place along the established tip and ring (T&R) connection, between the PABX and the CO. There are two methods of accomplishing the signalling function between the PABX and the CO. This is CO-system dependent; hence either one or the other is required. These two methods are:

1. Battery Removal
2. Battery Reversal

Also there are two types of "call-start" that have to be taken into account, "Ground Start" and "Loop Start". The functional sequence of each type of call-start was described in the foregoing section. Ideally the system should be compatible with both forms of start, although for reasons of complexity and, or, cost this may not always be implemented, and usage would be limited to one form.

1. Battery Removal

Figure 3:
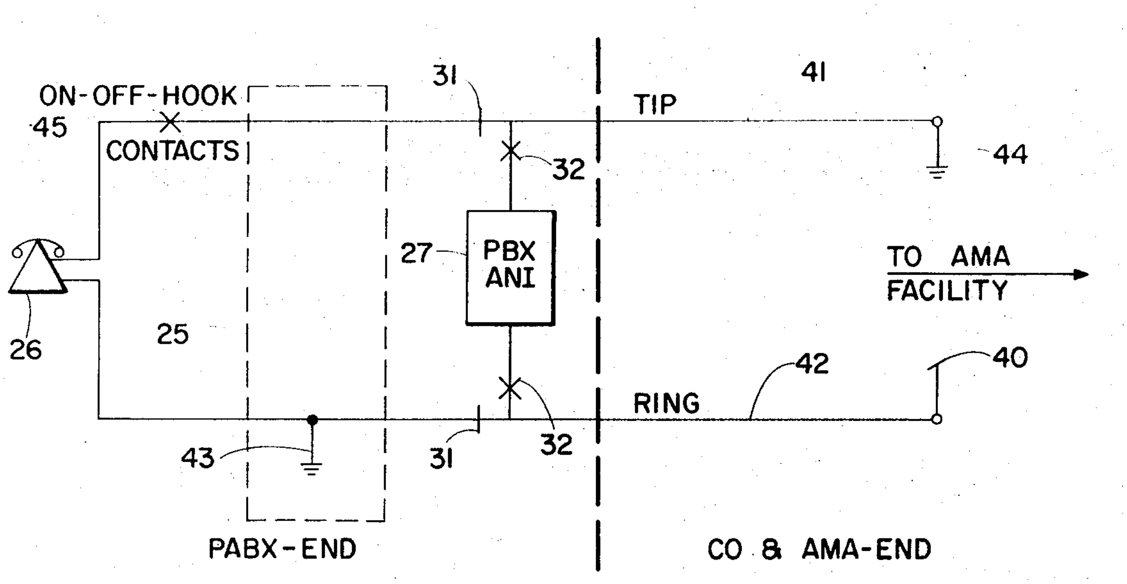
FIGS. 3 and 4 illustrate "Ground Start" and "Loop Start" arrangements for systems incorporating the invention using "battery removal"

A diagrammatic, very simplified, circuit for implementing battery removal signalling for a ground start system is illustrated in FIG. 3. The battery is indicated at 40, "tip" line at 41 and the "ring" line at 42. The PABX is indicated at 26 and the PBX-ANI is at 27.

Operation is as follows:

before a call is commenced, the battery 40 is on the ring 42 and the tip 41 is open in the CO; the ON-OFF hook contacts 45 are closed when the receiver is lifted; seize signal is made, when the digit 9 is dialled, by the ground 43 on the ring at the PABX 25; the tip is grounded at 44 in the CO -this gives dial tone to the PABX 25 and indicates that the CO is ready to accept the dialed digits; the ground 43 is removed from the ring at the PABX 25; the digits are dialled; and transmitted to the CO - the digits are stored in the register in the CO - outpulsing of the digits from the CO to the AMA equipment is commenced; the battery 40 being removed from the ring 42 in the CO when outpulsing of the digits to AMA equipment 33 (FIG. 2) starts; loss of the battery 40 from the ring 42 in the CO results in (a) the PABX station 26 being dropped from the circuit; (b) the PBX-ANI 27 being inserted onto the trunk circuit; the AMA equipment 33 sends out a request for the data on the calling station 26 - this request causes the battery 40 to be reinserted on the ring 42 in the CO; the AMA request passes right back or is relayed back to the PBX-ANI 27; the PBX-ANI 27 outpulses the data on the calling PABX station 26 to the AMA equipment 33 at the completion of the outpulsing; the PABX station 26 is returned to the line to await call progress indications and the PBX-ANI 27 drops itself from the connection. The status of the tip 41 and ring 42 are now the same as they would be at this point in an ordinary subscriber call. The tip 41 and ring 42 have been used to provide signalling and hence have eliminated the need for additional equipment for the transfer of the calling station identification.

Figure 4:
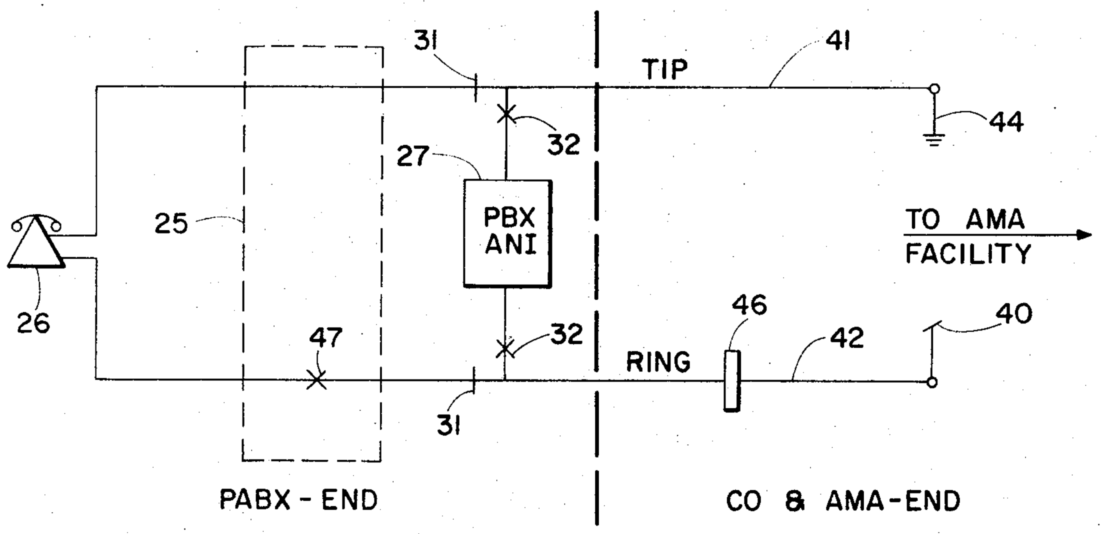

FIG. 4 is a diagrammatic, simplified, circuit for implementing battery removal signalling for a loop-start system. Items common with FIG. 3 have the same references. Operation is as follows: at the start the loop is open at the "Loop Make" normally open contacts 47, the battery 40 is on ring 42 and the ground 44 is on tip 41 in the CO; the digit 9 is dialled; the Loop Make contacts 47 are closed in the PABX 25 and the loop is completed - this is the seize signal recognized at the CO - the dial tone is sent from the CO and indicates that the CO is ready to receive digits from the calling end 26; the digits are dialled and transmitted to the CO; a relay 46 follows the dial pulses and repeats them to the CO; the digits are stored in the CO register; outpulsing of the digits from the CO to the AMA equipment 33 (FIG. 2) begins, causing removal of the battery 40 from the ring 42 in the CO; removal of the battery 40 at the CO end causes, at the PABX end (a) the dropping of the PABX station 26 from the circuit, and insertion of the PBX-ANI 27 onto the circuit; the AMA equipment sends out a request for the data on the calling station 26 and this request causes the battery 40 to be reinserted on the ring in the CO; the AMA request is, in effect, passed right back to the PBX-ANI 27 and the PBX-ANI outpulses the data on the calling station 26 to the AMA equipment 33 at the completion of outpulsing the calling station 26 is returned to the line to await call progress indications; the PBX-ANI 27 drops itself from the connection. Apart from the first two steps, the implementing of this system, with respect to using the tip and ring, 41 and 42, for signalling purposes, is the same for both loop and ground start.

Figure 5:
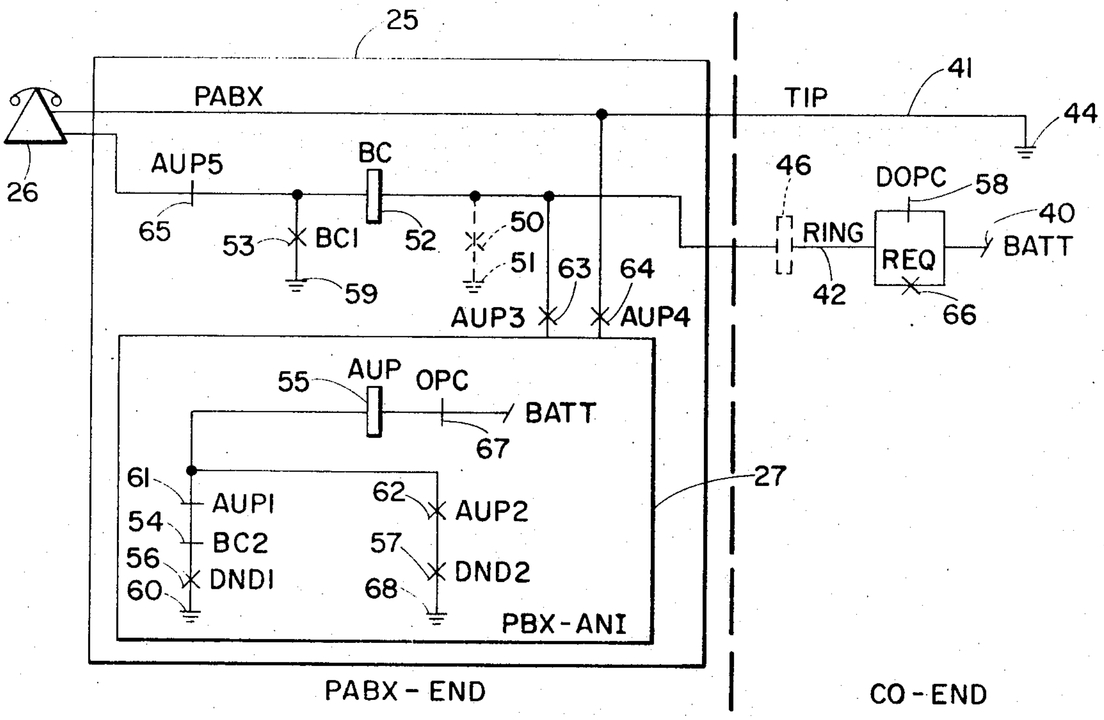
FIG. 5 illustrates a signalling circuit for use in systems in accordance with the present invention.

The circuits illustrated in FIGS. 3 and 4, use battery removal to initiate the PBX-ANI function. FIG. 5 illustrates one signalling circuit suitable for the PBX-ANI in accordance with the present invention. Considering first a ground start system, contacts 50 are required. The dialling of the digit 9 would cause these contacts to be closed, provide the seize signal, and then allow ground 51 to be placed on the ring at the PABX 25, which in turn causes ground 44 to be placed on the tip 41 in the CO. Ground 44 on the tip 41 in the CO gives dial tone and causes the removal of the ground 51 through the contacts 50 at the PABX 25. For loop start the "follower" relay 46 would be in the ring line 42 in the CO instead of the contacts 50 in the PABX 25. The circuit and its functions are the same for both types of start from this point as follows.

When the tip 41 in the CO is grounded, at 44, the loop is complete causing the battery control (BC) relay 52, to operate and lock itself on through the BC1 make contacts 53 to ground 59. The BC2 break contacts 54 open which places another open in the circuit of the AUP relay 55. At this point the station 26 starts to dial the called number into the CO equipment. When the digit 9 was initially dialled the DND1 and DND2 contacts 56 and 57 were closed starting to prepare the PBX-ANI 27 for outpulsing; after which the access code and called number was registered in the CO in preparation for outpulsing to the accounting equipment 33 (FIG. 2).

When the last digit is outpulsed or transferred to the accounting equipment 33 the DOPC contacts 58 in the CO are opened. This removed battery 40 from the ring 42 in the CO which in turn causes the BC relay 52 in the PABX 25 to be dropped allowing the BC1 contacts 53 to return to normally open, removing the locking ground 59 for the BC relay 52, and causes the BC2 contacts 54 to return to normally closed. Ground 60 is now applied to the AUP relay 55 through the BC2 normal, AUP1 normal and the DND1 make contacts 54, 61 and 56 respectively. The AUP relay 55 operates and locks itself on through the AUP 2 make contacts 62 and the previously closed DND2 contacts 57 to ground 68. The AUP3 and AUP4 contacts 63 and 64 are made which inserts the PBX-ANI 27 onto the tip and ring 41 and 42. At the same time the AUP5 contacts 65 are broken which removes the station 26 from the line.

When the accounting equipment is ready it requests the information on the calling end. This request closes the REQ contacts 66 in the CO and reapplies battery 40 on the loop, which now has the PBX-ANI 27 inserted at the calling end instead of the PABX extension 26. The PBX-ANI 27 outpulses the information on the calling number. This information consists of the permanently stored data, such as the office code, and the recently stored PABX station number. The outpulsed data goes straight to the accounting equipment 33 (FIG. 2). As the last digit is outpulsed from the PBX-ANI 27 the OPC break contacts 67 in the PBX-ANI 27 are opened. This drops the AUP relay 55, which removes the PBX-ANI 27 from the circuit, and which in turn, returns the PABX station 26 to the line to await final connections, by the CO, to the called end.

If the subscriber has been only making a local CO call the accounting equipment 33 (FIG. 2) would not have been summoned, in which case battery 40 would not have been removed from the ring 42 in the CO by the DOPC contacts 58. The BC relay 52 in turn would not be dropped and hence the PBX-ANI 27 would not have replaced the calling station 26 on the tip 41 and ring 42 at the PABX 25.

2. Battery Reversal

The signalling using battery removal, as described previously in connection with FIGS. 3 to 5 for example, is not fully satisfactory for some switching systems. While circuitry could be provided, this is likely to be expensive, and complicated. An alternative is to use battery reversal instead of battery removal. It would be implemented in a similar fashion to battery removal, i.e., instead of removal of the battery in the CO when the CO outpulses the called digits to the AMA equipment 33 (FIG. 2), the new signalling method would produce a battery reversal on the Tip 41 and Ring 42 on the CO. This reversal would be detected by the PBX-ANI equipment 27, causing the same functions to be activated as were activated by the detection of the battery removal in the previous signalling method. When the AMA equipment 33 sends out a request for the data on the calling station 26, this would cause a second battery reversal to take place in the CO. This would put the Tip 41 and Ring 42 back into the state in which they would be at this point in time using the battery removal signalling method. Similarly this second reversal would cause the same functions to take place as required, as the reinsertion of battery did in the battery removal signalling method.

One PBX service - Toll Diversion - already uses a battery reversal. But Toll Diversion and PBX-ANI would not be used together, so battery reversal as a signalling method for PBX-ANI will not cause difficulties.

Differentiating between Toll Diversion and PBX-ANI is easily accomplished by tying the PBX-ANI functions, brought about by the battery reversal, into the PBX-ANI class of service proposed as part of the system. With Toll Diversion battery reversal an auxiliary line circuit is required. A line circuit will probably be required also for the battery reversal signalling proposed for the PBX-ANI system.

Figure 6:
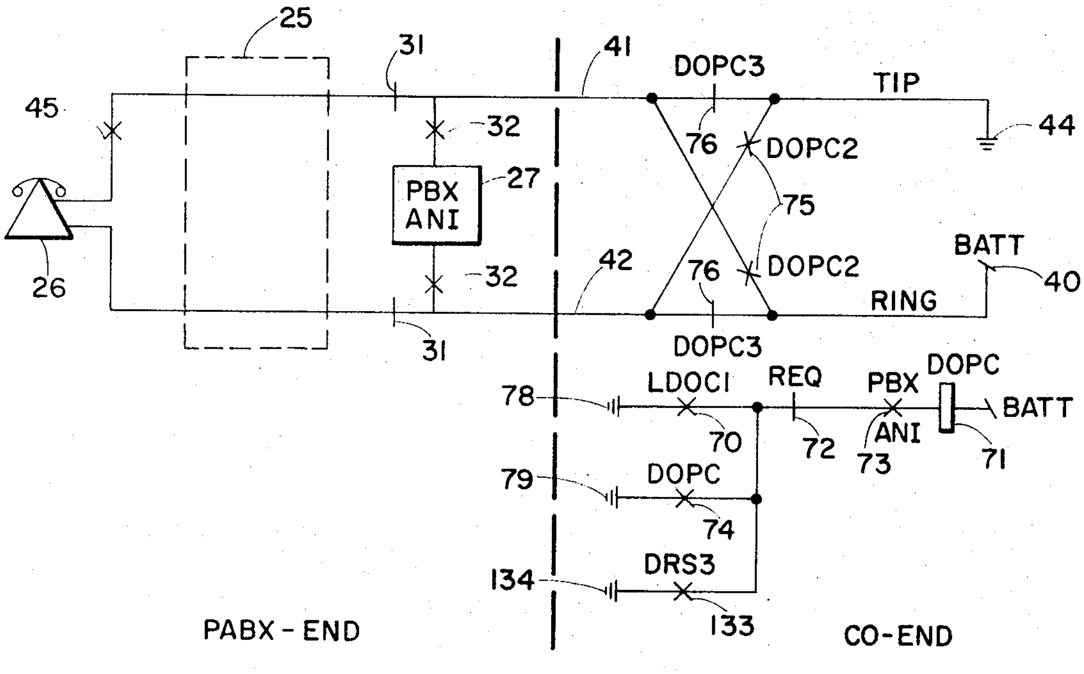
FIG. 6 is a circuit for implementing signalling using "battery reversal"

FIG. 6 is a diagrammatic, simplified, circuit for implementing signalling, using battery reversal. Operation is as follows: initially battery 40 is on ring 42 and ground 44 is on tip 41, in the CO; digit 9 is dialled completing the loop and producing a seize signal; dial tone is transmitted from the CO indicating that the CO is ready to receive digits from the calling end; digits are dialled and sent to the CO; the digits are stored in the CO register; outpulsing of the digits from the CO to the AMA equipment 33 (FIG. 2) begins; at completion of outpulsing, LDOC1 contacts 70 are closed, providing ground 78 for the DOPC relay 71 through contacts LDOC1 70, REQ break contacts 72 and PBX-ANI make contacts 73 which had been closed earlier in the call when the PBX-ANI class of service was activated; relay DOPC 71 locks itself on with ground 79 through DOPC1 make contacts 74, REQ contacts 72 and PBX-ANI contacts 73; also when the DOPC relay 71 operates, DOPC2 contacts 75 and DOPC3 contacts 76 provide a battery reversal at the ring 42 and tip 41; this battery reversal at the CO ring 42 and tip 41 causes (a) dropping of the PABX station 26 from the circuit; (b) insertion of the PBX-ANI 27 onto the trunk circuit at the PABX 25; the called digits are sent from the CO to the AMA equipment 33 (FIG. 2) and the AMA equipment returns a request for the data on the calling station 26 - this request opens REQ contacts 72, removing ground from the DOPC relay 71, causing a battery re-reversal by returning DOPC2 contacts 75 and DOPC3 contacts 76 to their normal condition, thus returning the tip 41 and ring 42 to their original conditions; the re-reversal is detected at the PABX 25, causing the PBX-ANI 27 to outpulse the data on the calling PABX station 26 to the AMA equipment 33 (FIG. 2); at the completion of PBX-ANI outpulsing the PABX station 26 is returned to line and the PBX-ANI 27 is removed; further call progress indications are then awaited.

Also shown in FIG. 6 are DRS3 contacts 133. These contacts are an alternative to LDOC1 contacts 70, contacts 70 being used with CAMA and contacts 133 with LAMA, as described later with reference to FIGS. 9 and 11 respectively.

PABX End

The calling stations 26 of the CENTREX type PABX will have unique seven digit numbers. The first three digits will be common to the PABX 25 itself and also to all the stations 26. If, as is usual, all the numbers of the PABX stations 26 are sequential then one or more of the remaining digits will be common. Thus, for example, for a PABX 25 with less than ten stations 26, the final digit of the PABX 25 can be 0 and the final digits of the stations 26 will be from 1 to some number up to 9. In such an instance the thousands, hundreds and ten digits will be common. Thus it is possible to permanently store in the PBX-ANI equipment 27 several of the digits of the calling stations 26 - all those common to all stations.

Figure 7:
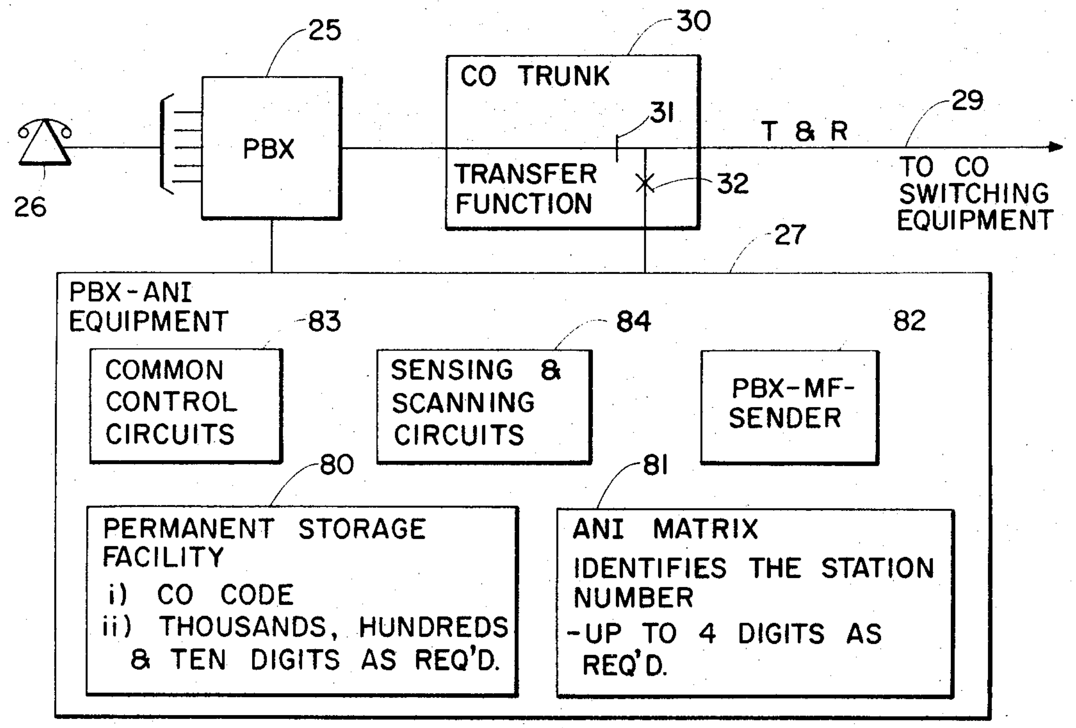
FIG. 7 is a block diagram of the PABX end.

FIG. 7 illustrates in more detail the arrangement at the PABX location. The PBX-ANI equipment 27 is composed of three main items, individually of known form. First is a permanent storage 80 which provides for storing some of the 7 digit number. Its digits are composed of the central office code and one or more of the remaining four digits depending on the portion of the CO number group used and on the number of stations 26. Second is the automatic number identification ANI matrix 81 which identifies the digits of the calling station 26 and stores them. The third item is the PBX-ANI-MF sender or outpulser 82. This serially adds the digits of the permanent storage facility 80 and the digits of the station number identification facility 81. It then outpulses via multifrequency tones the full seven digits to the Automatic Message Accounting (AMA) equipment 33 (FIG. 2) after receipt of the request signal from that equipment for the data on the calling end. The PBX-ANI equipment 27 is also associated with the trunk 30 through the transfer function contacts 31 and 32 which temporarily removes the calling station from the T&R 29 and replaces it with the PBX-ANI equipment 27 for a period of time just prior to the request, from the AMA equipment, for the calling number, until the outpulsing of the calling number from the PBX-ANI 27 is complete.

The PBX-ANI equipment 27 also includes control circuits 83 and sensing and scanning circuits 84, of known forms.

CENTRAL OFFICE END

Depending upon the particular switching system used various functions have to be incorporated in the CO to use the invention and some typical examples of such systems are the No. 5 Crossbar system such as is manufactured by Northern Electric Company Limited, under the trade name NE5; the self-seeking crossbar system manufactured under the trade name SF-1 by Northern Electric Company Limited; the step-by-step system; and electronic switching systems.

NO. 5 CROSSBAR SWITCHING SYSTEMS ARRANGED FOR ANI-CAMA

Two main functions have to be incorporated in this type of central office in order to use the proposed PBX-ANI system. First is the provision of a means of using the tip and ring leads for PBX-ANI signalling. Second is the providing of PBX-ANI as a class of service. This special class of service indicates:

1. That central office ANI (CO-ANI) is not required.
2. That the outgoing sender in the central office is to be released immediately upon outpulsing the called number.
3. That the outgoing sender upon release is to cause the outgoing trunk to cut-through and assume control.

The result is to make the central office in effect transparent to transmissions between the PABX and the CAMA centre.

NO. 5 CROSSBAR SWITCHING SYSTEM ARRANGED FOR LAMA

Four main functions must be incorporated in this type of central office. First is the provision of means for using the tip and ring leads for PBX-ANI signalling. Second is the providing of PBX-ANI as a class of service. In the LAMA usage the special class of service:

1. Indicates that central office ANI (CO-ANI) is not required.

2. Causes the outgoing sender and the transverter connector to be released immediately upon transferring the called number to the transverter.

3. Causes the translator to be switched from the transverter connection to the digit absorber connection upon receipt of the PABX line equipment location information.

4. Causes a PBX-MF-Receiver to be switched into the tip and ring in the outgoing trunk.

The third main function required is the digit absorber. This simply disposes of the translated PABX line equipment location data. The fourth main function required is the PBX-MF-Receiver. It receives the calling number data from the PBX-ANI outpulser in MF and transfers it to the transverter in 2-out-of-5 code. The above two arrangements for NE 5 Crossbar switching systems are illustrated in FIGS. 8 to 11 and described below.

SF-1 CROSSBAR SWITCHING SYSTEM

This crossbar system requires two main functions to be incorporated in the CO. First is the provision of a means of using the tip and ring leads for PBX-ANI signalling. Second is the provision of the PBX-ANI class of service which causes:

1. The originating register sender to release itself at that point in the call when it would normally reseize a decoder to get the calling number information from the CO-ANI;
2. Control to be placed under the Outgoing Trunk so that the CAMA request passed back to the PBX-ANI equipment.

Figure 12:
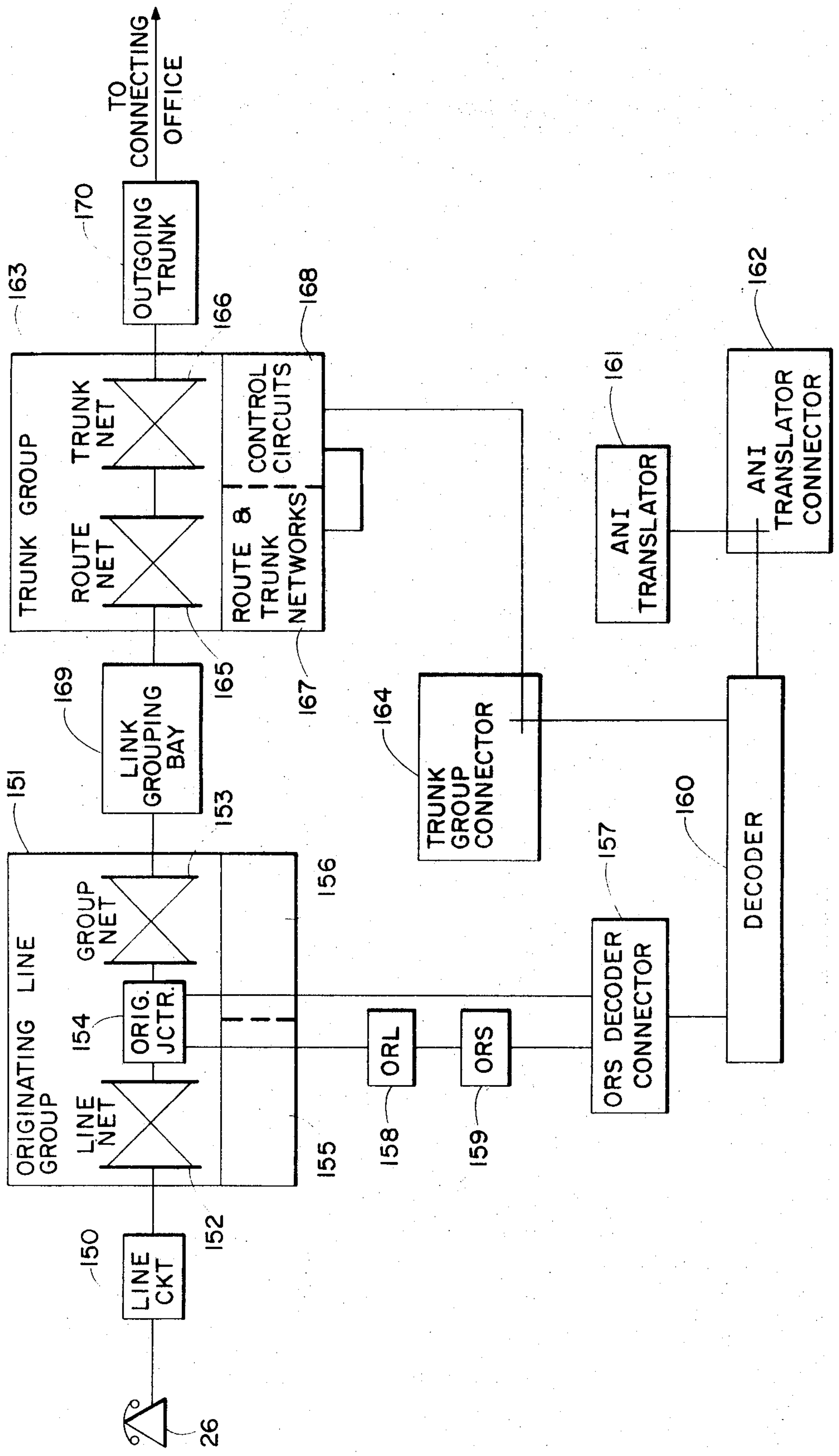
Fig. 12 PRIOR ART
FIG. 12 is a block diagram of a SF-1 switching system not incorporating the present invention.

This system is illustrated in FIG. 12 and described below.

STEP BY STEP SWITCHING SYSTEM (SXS)

This system employs switching principles which differ completely from the crossbar system. This leads to a number of entirely different functions which have to be incorporated into the CO for the PBX-ANI system to be compatible. They are:

1. Gang the sleeve leads from the Main Distribution Frame (MDF) to the number networks so that lines of common origin (i.e. the PABX stations) will generate the same code number;
2. Provide the line circuit with a tone detector and relay function which causes the battery and ground removal/replacement function at the CO tip and ring for the PBX-ANI signalling;
3. Provide the outpulser with a discriminating circuit for recognizing the generated code number;
4. Prevent the outpulser from transmitting to the CAMA equipment;
5. Cause the outpulser and identifier to be dropped from the connection;
6. Place control under the ANI trunk and cut it through, providing a complete connection from the PBX-ANI to the CAMA equipment.

Figure 13:
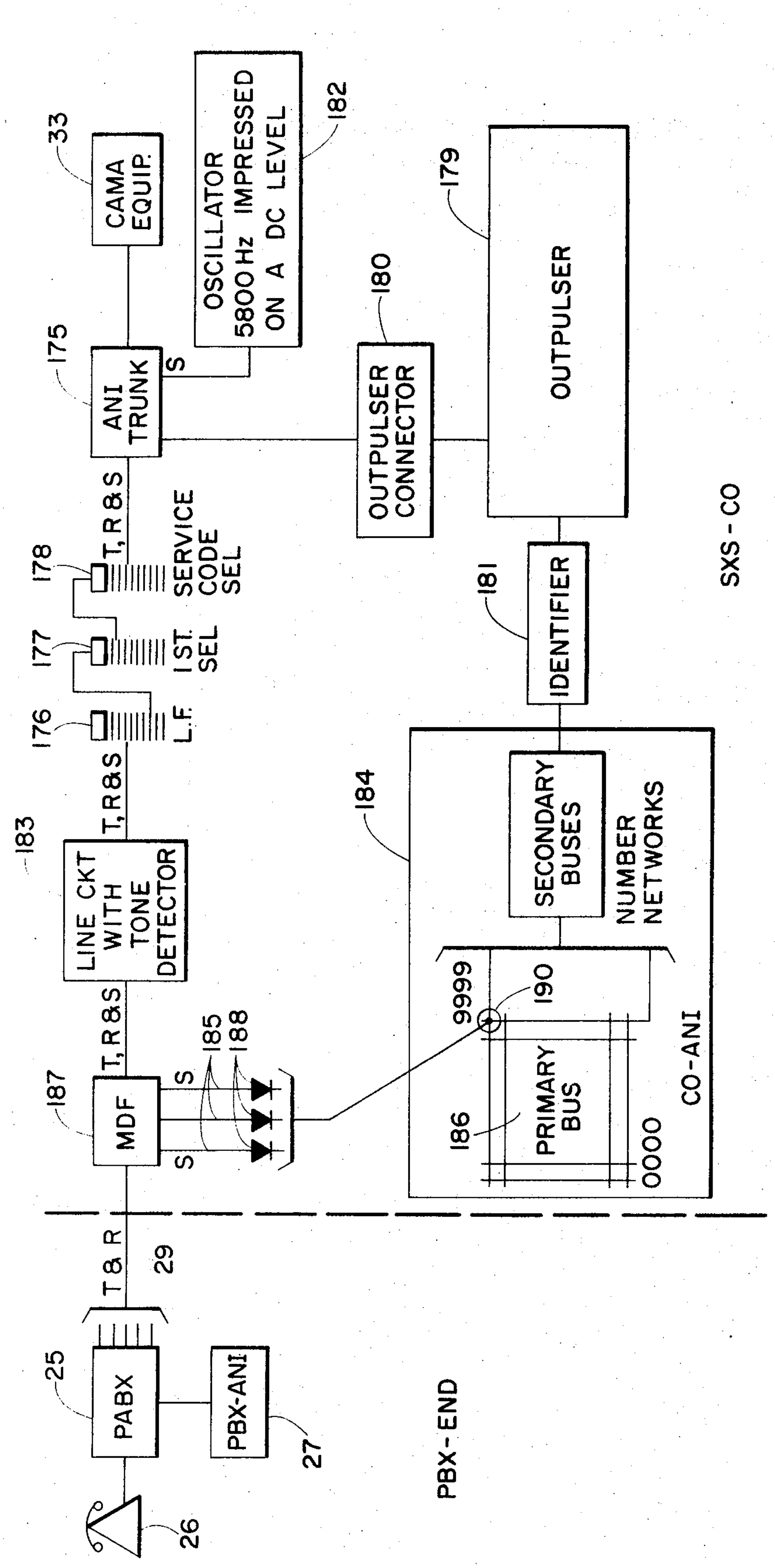
FIG. 13 is a block diagram of a Step-by-Step switching system, incorporating the present invention.
Figure 14:
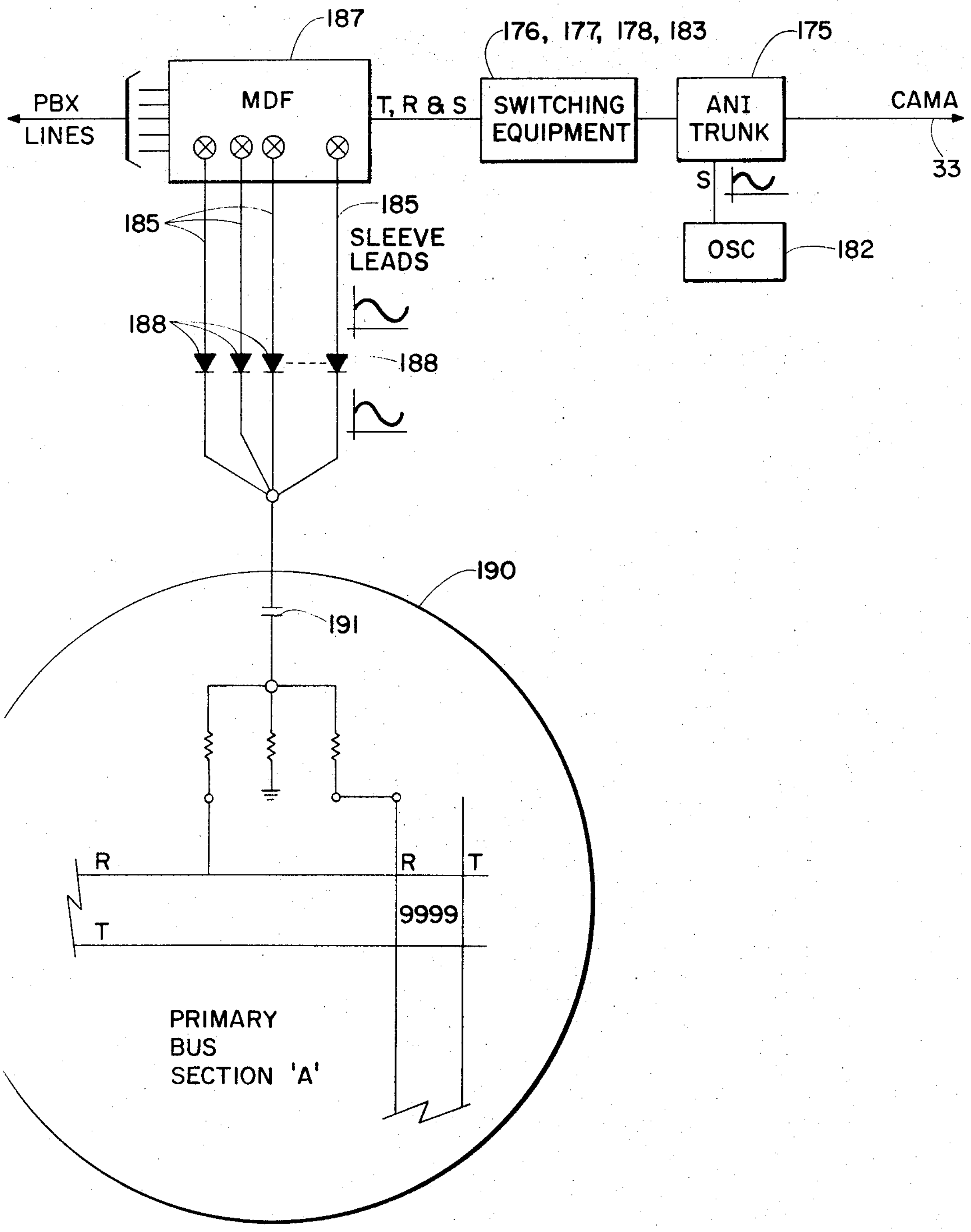
FIG. 14 illustrates part of FIG. 13 to a larger scale.

The above system is illustrated in FIGS. 13 and 14 and is also described below.

ELECTRONIC SWITCHING SYSTEM (ESS) ARRANGED FOR ANI

For an ESS CO, provision of the PBX-ANI system is basically a matter of additions and changes to the stored program. The program changes are required to make the outgoing trunk and originating junctor become transparent at the appropriate point in the call and to repeat the request signal from the CAMA equipment 33 (FIG. 2) to the PABX 25 (FIG. 2).

The hardware changes will be minimal with the only obvious additions being required for the PABX signalling function.

In the case of the NE Co. SP-1 ESS a relay switching function, controlled by the Central Processing Unit, is required to provide battery removal and battery replacement at the ring and tip in the CO for PABX signalling (instead of battery reversal and re-reversal as required by the NE5 Crossbar system).

However to apply the system to ESS, again battery reversal is the PABX signalling method required. The only hardware additions would be the one magnetic latching relay per PABX line needed to produce this reversal. There would be of course a substantial software change.

A call would be processed as follows. The calling station would be connected to a digit receiver in the normal way and would dial in the called number. Three digit translation would indicate a chargeable call. Battery would be reversed on the PABX line and an MF receiver would be connected in place of the digit receiver. Battery would be returned to normal and the PBX-ANI would send the calling number to the MF Receiver in the CO. All the call charging information would be stored away in memory, prior to writing on the AMA tape, and the call would continue in the usual way.

NO. 5 CROSSBAR SWITCHING SYSTEM ANI-CAMA CO

Figure 8:
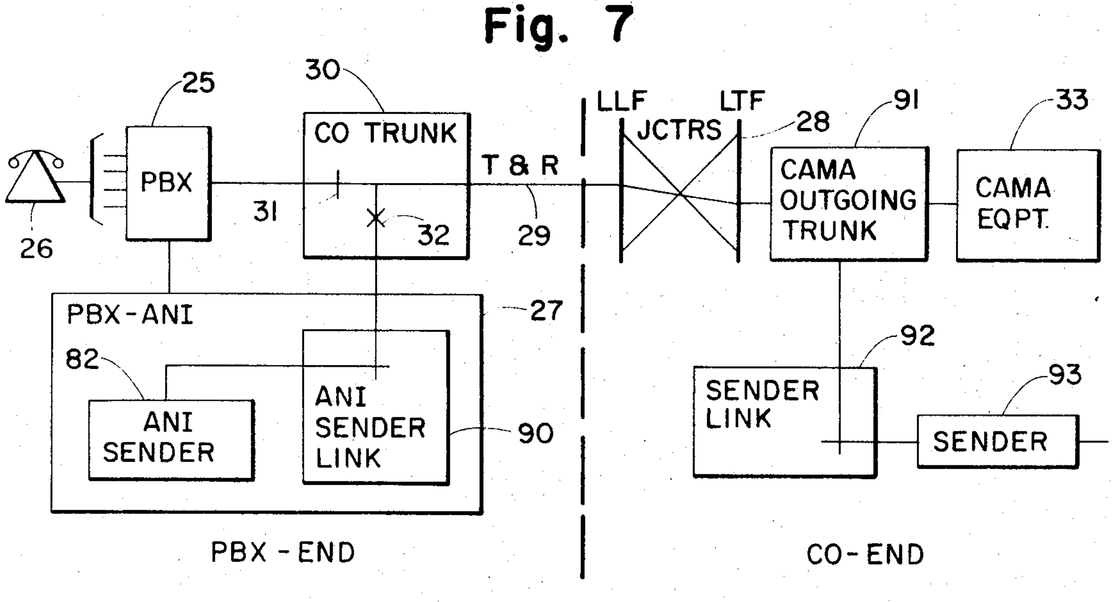
FIG. 8 is a block diagram of the present invention used with a No. 5 Crossbar ANI-CAMA CO.

FIG. 8 illustrates in simplified block form, the arrangement of the PABX 25 and CO for an ANI-CAMA system incorporating the present invention. The references as applied to FIG. 6 are applied to corresponding items in FIG. 8. In FIG. 8, only the ANI sender 82, of the PBX-ANI equipment 27, is shown although the other items as in FIG. 6 are also provided. The PBX-ANI-MF sender 82 is connected to the trunk 30 by an ANI sender link 90. At the CO end, the T&R lines 29 extend to the Line Link Frame (LLF), Junctors (JCTRS), and Trunk Link Frame (TLF), indicated generally at 28. From the CO the call will be passed through an outgoing trunk 91. Trunk 91 connects to both the CAMA equipment 33 and, via a sender link 92, to CO sender 93.

Figure 9:
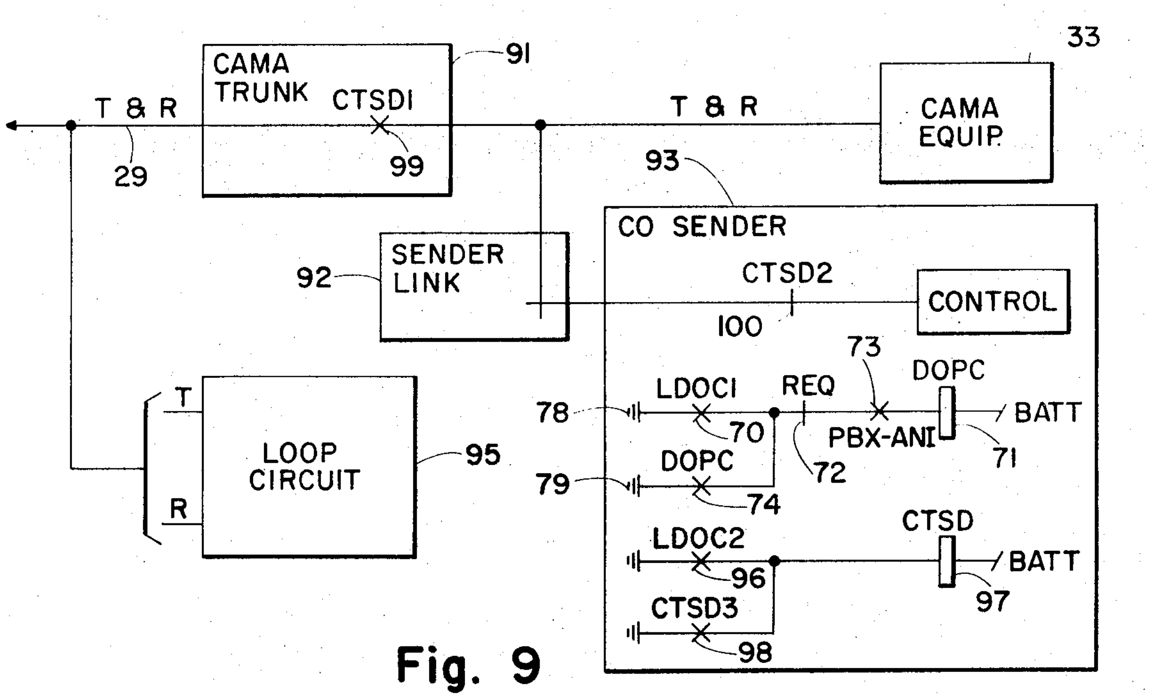
FIG. 9 is a circuit diagram for use in the arrangement of FIG. 8.

A circuit arrangement which will permit the PBX-ANI to function with a No. 5 Crossbar ANI-CAMA CO is shown in FIG. 9. Items common to FIG. 8 are given the same references.

When the CO sender 93 outpulses the called number to the CAMA equipment 33, the last digit will activate a function causing LDOC1 and LDOC2 contacts 70 and 96 to be closed. In doing so LDOC2 contacts 92 cause the CTSD relay 97 to operate and lock itself on through CTSD3 contacts 98. The CTSD1 and CTSD2 contacts 99 and 100 fulfill the requirements of cutting through the CAMA trunk 91 (FIG. 8) and at the same time immediately dropping the CO sender 93 from the circuit when the last called number digit is outpulsed. Simultaneously the DOPC relay 71 is operated through LDOC1 contacts 70, made, REQ contacts 72, normally made, and PBX-ANI contacts 73 made when the PBX-ANI class of service was activated. The DOPC relay 71 locks on through DOPC1 contacts 74. Operation of DOPC relay 71 causes the DOPC2 contacts 75 and DOPC3 contacts 76 of FIG. 6 to operate which reverses battery on the tip 41 and the ring 42. The DOPC2 and DOPC3 contacts 75 and 76 which produce the battery reversal are part of the loop circuit 95 (FIG. 9). The reversal signals to the PBX-ANI 27 to attain a ready state and fulfill the requirement for the PBX-ANI 27 connections.

When the CAMA equipment 33 requests the calling number information, the request signal causes the REQ contacts 72 to be opened. This removes ground from the DOPC relay 71 and causes the battery re-reversal function to take place by the return of the DOPC2 contacts 75 and DOPC3 contacts 76 (FIG. 6) to the normal condition in the loop circuit 95. This in turn causes the PBX-ANI 27 to outpulse the calling number information and transmit it directly to the CAMA equipment 33.

The sequence of the various functions as they take place with the present invention in use with a No. 5 Crossbar ANI-CAMA Central Office is as follows, giving first a ground-start system:

lift receiver - in the CO the battery is on the Ring and Tip is open; the station dials the digit 9 - the CO conditions after the dialling are - a seize signal is produced by ground inserted on the Ring in the PBX - the Tip in the CO is grounded; the PABX is made transparent; the CO gives dial tone indicating it is ready to accept dialled digits; the ground is removed from the Ring in the PABX; the PABX station dials the access code; the CO recognizes that the PBX-ANI class of service is required; the CO recognizes that Automatic Message Accounting is required by the activation of the PBX-ANI class of service; the rest of the called digits are dialled and transmitted to the CO; the called digits are stored in the CO register; the CO equipment determines the calling-line location; an outgoing trunk is seized; connections through the CO are made; the sender outpulses the called number to the connecting CO; the sender begins to transmit the called number to the CAMA equipment; battery is reversed at the PABX-CO Ring Connection at the CO; the PABX station is dropped from the line and the PBX-ANI simultaneously inserted into the line; the CO sender releases itself from the circuit; supervision is put under control of the outgoing trunk; the Automatic Message Accounting request signal causes battery re-reversal in CO; the re-reversal of battery on the Ring in the CO causes the PBX-ANI to MF outpulse the calling station number; completion of MF outpulsing causes the return of the PABX station to the line and the simultaneous removal of the PBX-ANI from the line; the calling digits are received by the CAMA equipment and are processed to complete the billing; normal call progression then continues.

For a Loop-Start system the sequence is varied slightly, being as follows:

lift receiver - in the CO the battery is on the Ring, Ground is on the Tip and the Loop is open at the PABX; station dials digit 9, a seize signal is produced by closing the Loop-Make contacts in the PABX - at the CO, Ground remains on the Tip and battery remains on the Ring; the PABX is made transparent; the CO gives dial tone, indicating it is ready to accept dialled digits; the access code is dialled; the CO recognizes that the PBX-ANI class of service is required; the CO recognizes that Automatic Message Accounting is required by the activation of the PBX-ANI class of service; the rest of the called digits are dialled and transmitted to the CO; a relay follows the dial pulses and repeats them to the CO; the called digits are stored in the CO register - and the remainder of the sequence is as for Ground Start.

NO. 5 CROSSBAR SWITCHING SYSTEM LAMA CO

Figure 10:
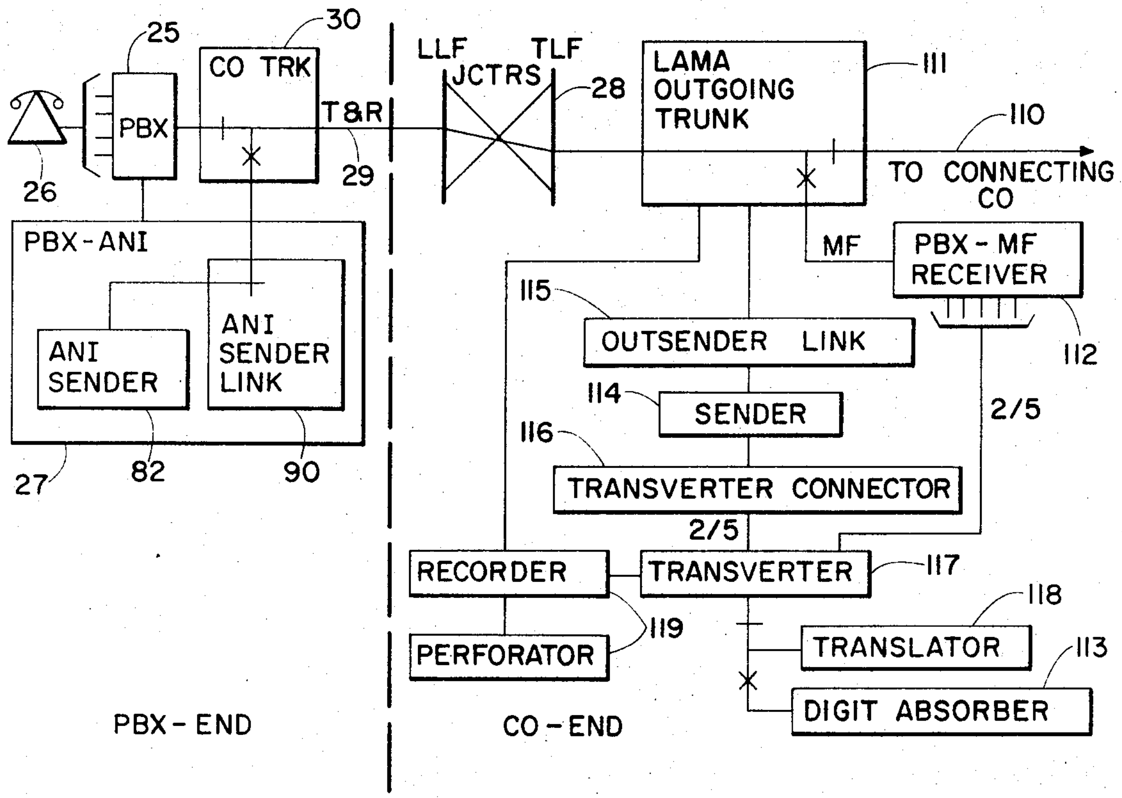
FIG. 10 is a block diagram of the present invention used with a No. 5 Crossbar LAMA CO.

FIG. 10 is a simplified block diagram, illustrating the present invention with a LAMA-CO. Where applicable the same references are applied for the same items as in previous figures. The PABX 25 has the PBX-ANI equipment 27, which includes the PBX-ANI-MF sender 82 and sender links 90 for connecting the sender 82 to the trunk 30 and thence to the T&R 29. This in turn is connected to the CO switching equipment indicated generally at 28. Incorporated in the CO are several items of equipment, which are connected to the outgoing tip and ring line 110 to the called CO via a LAMA outgoing trunk 111. These items of equipment comprise various items which are already present in an existing LAMA-CO, plus two additional items - a PBX-MF-Receiver 112 and a Digit Absorber 113.

In a CO arranged with LAMA facilities an ordinary subscriber DDD call progresses in approximately the same way as a CAMA call up to the point where the called number is stored in the outgoing sender 114 via outsender link 115. However, at this point there is a major difference. The CO sender 93 in the CO with ANI-CAMA facilities (FIG. 8) MF outpulses its stored data to the CAMA equipment 33. The CO sender 114 in the CO arranged for LAMA facilities simply transfers its stored data, in 2-out-of-5 code, through a transverter connector 116 and transverter 117 to the translator 118.

This means that the LAMA equipment does not have MF receiving capabilities. Also the LAMA equipment does not have direct access to the outgoing trunk 111 tip and ring 110 over which the data from the PBX-ANI is transmitted.

After the LAMA sender 114 has passed the information on the called end to the transverter 117 it transmits the called number to the connecting CO. The transverter meanwhile, after receiving the called number, seizes a translator frame 118 and passes the line link frame location, part of 28, of the calling line 29 to it. The translator 118 translates the calling number from this information and passes it back to the transverter 117.

In order to incorporate the PBX-ANI system of the present invention it is necessary to temporarily disable the CO sender 114 and translator 118, prevent them from doing the job they would normally do, and inject into the equipment the information on the calling PABX station 26.

The operation of the arrangement shown in FIG. 10 is as follows. Operation is the same for an ordinary subscriber DDD call and a PBX-ANI DDD call up to a point where the LAMA sender 114 has: (1) transmitted its data on the called number to the connecting CO, and (2) transferred the data to the LAMA transverter 117. In the system according to the present invention, the LAMA sender 114 will drop itself and the transverter connector 116 from the circuit upon passing the information on the called end through the transverter 117 to the translator 118. At the same time that the sender 114 is dropping itself, the PBX-MF-Receiver 112 is inserted on the outgoing LAMA trunk 111, tip and ring 110. This is to prepare the PBX-MF-Receiver 112 to receive the MF outpulsed information on the calling station 26 from the PBX-ANI 27, when it is requested.

The translator 118 in an ordinary subscriber DDD call, provides a means for translating the subscribers' line equipment location, i.e. line link frames, horizontal group, vertical group, and vertical file, from 28 into a directory number. This information is not used in the system of the invention since the line equipment location will be only that of the PABX trunk not the individual station 26 making the call. Hence, the translator 118 will drop itself from the circuit at completion of receiving, from the transverter 117, the information on the calling PABX's line equipment location. The translator 118 will then, instead of returning the translated digits to the transverter 117, pass the digits into a digit absorbing circuit 113. Activation of the digit absorbing circuit will be, "the request for the calling number information" and will activate the related contacts in the loop circuit 108 (FIG. 11) which in turn provides the required signalling - described later with reference to FIG. 11.

This request for calling number identification will cause the PBX-ANI-MF sender 82 to MF outpulse its stored information on the calling number. The PBX-ANI sender 82 will MF outpulse on the tip and ring 29, through the CO 28 and outgoing LAMA trunk 111, to the PBX-MF-Receiver 112 in the LAMA equipment. The PBX-MF-Receiver 112 will now transfer the data in 2-out-of-5 code to the transverter 117. Hence the transverter 117 receives from the PBX-MF-Receiver 112 the actual calling PABX station number.

To implement the above-described function, it will be necessary for the PBX-ANI class of service, in conjunction with translator acknowledgement of receipt of the last piece of information on the calling number from the transverter 117, to be the activating function which causes the translator 118 to send its translated line equipment location information to the digit absorber 113 instead of back to the transverter 117. As the last PABX station-number digit leaves the PBX-MF-Receiver 112 for the transverter 117, the LAMA sender 114 and transverter 117 are reconnected into the circuit. These units are returned to the state in which they would be if they had been handling an ordinary subscriber DDD call. The PBX-MF-Receiver 112 now releases and returns the tip and ring 110 to the connecting CO line. The digit absorbing circuit 113 is dropped and made ready for the next call.

Figure 11:
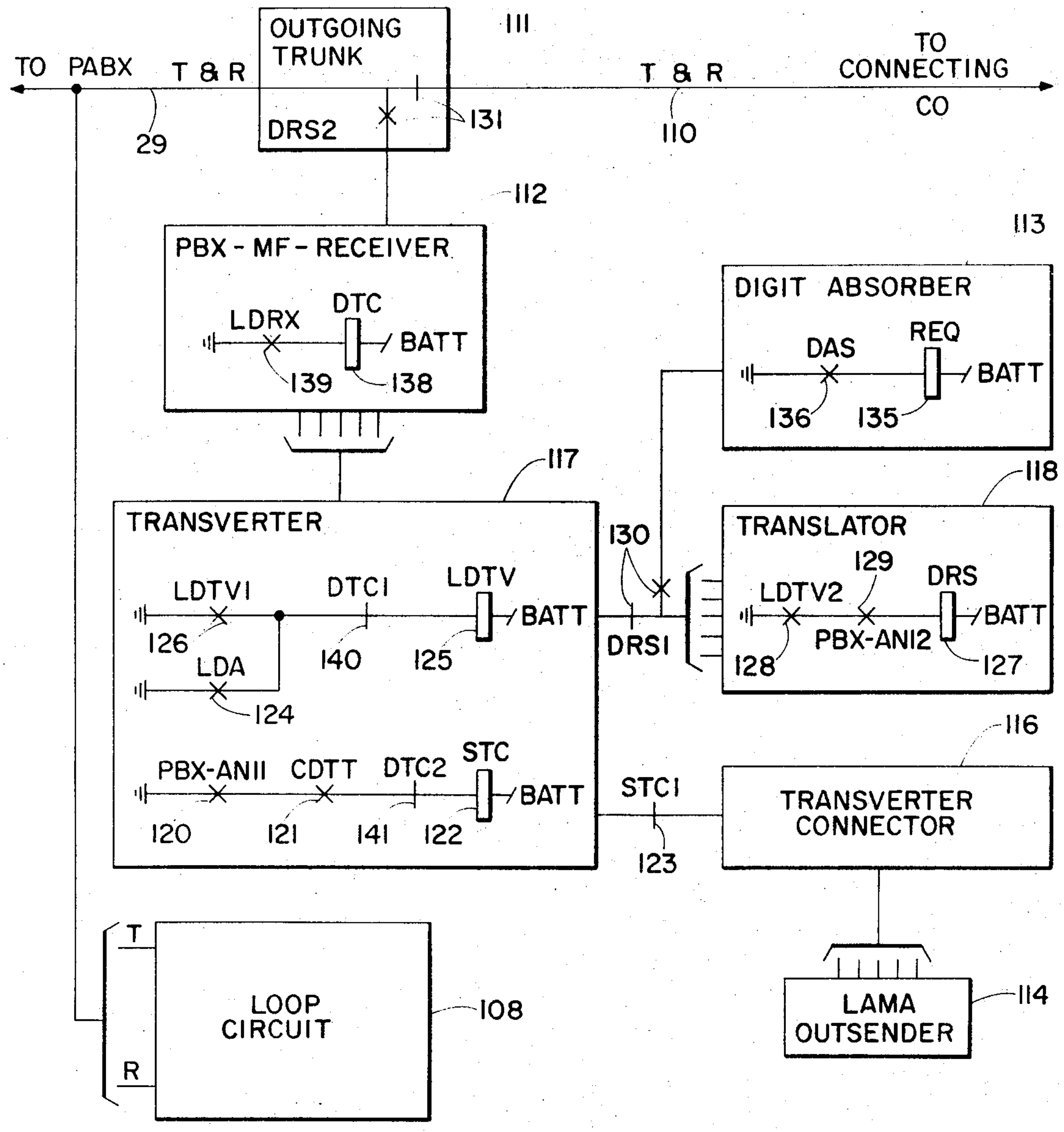
FIG. 11 is a circuit diagram for use in the arrangement of FIG. 10.

A simplified circuit for the arrangement of FIG. 10 is shown in FIG. 11. Details of the operation are as follows.

When the information on the called end has been completely transferred to the transverter 117 it causes a relay referred to as a CDTT relay (not shown) and forming part of the equipment modification, to operate. Since the PBX-ANI1 contacts 120 were previously closed when that class of service was selected, the closing of the CDTT contacts 121 brings ground to the STC relay 122 in the transverter 117. The STC relay 122 operates, temporarily removing the transverter connector 116 and the LAMA outsender 114 from the circuit by means of STC1 contacts 123.

At this point in time the transverter 117 has also received data on the PABX line equipment location. This is sent on to the translator 118 as in an ordinary call. But just as the last digit is sent to the translator, the LDA contacts 124 give ground to the LDTV relay 125 which locks itself on through the LDTV1 contacts 126. The LDTV relay 125 is shown as self-locking-on because of the implication that the LDA relay, and hence contacts 124 will have responded to a momentary signal.

The translator 118 receives the data on the PABX line location and continues to process it just as if it was data on an ordinary subscriber call. But when the LDTV relay 125 operated it had provided ground to the DRS relay 127 through the LDTV2 contacts 128, and the previously made PBX-ANI2 make contacts 129. The activated DRS relay 127 disconnects the translator 118 from the transverter 117 and connects the translator 118 to the digit absorber 113 through the DRS1 contacts 130. Also the DRS relay 127 temporarily puts the PBX-MF-Receiver 112 on the tip and ring 29 in the LAMA outgoing trunk 111, and likewise temporarily removes the outgoing trunk 111 from the connection to the connecting CO by means of DRS2 contacts 131. This function puts the PBX-MF-Receiver 112 in a position to receiver MF signalling from the PBX-ANI sender 82 (FIG. 10) when it transmits. Operation of the DRS relay 127 also causes the required battery reversal to take place in the Loop circuit 108. When the DRS relay 127 operates, the DRS3 contacts 133 (FIG. 6) close, providing ground 134 (FIG. 6) to the DOPC relay 71 (FIG. 6) through REQ contacts 72 (FIG. 6) and made PBX-ANI contacts 73 (FIG. 6). This in turn causes the battery reversal by means of the DOPC2 contacts 75 and the DOPC3 contacts 76 of FIG. 6. In effect the DRS3 contacts 133 are the LAMA equivalent of the LDOC1 contacts 70 (FIG. 6) which produce the battery reversal for the ANI-CAMA CO and signal the PBX-ANI to prepare to outpulse.

Meanwhile the translator 118 has tried to pass the translated calling line data back to the transverter 117. However the DRS1 contacts 130 will have directed this information to the digit absorbing circuit 113 instead.

As soon as the first digit arrives at the digit absorber 113 the REQ relay 135 is operated through the DAS contacts 136. The REQ contacts 72 (FIG. 6) are the contacts opened by the REQ relay 135 in the LAMA-CO arrangement of FIG. 11. As seen earlier, when the REQ contacts 72 (FIG. 6) open the battery re-reversal function takes place in the loop circuit 108. This battery re-reversal causes the PBX-ANI-MF sender 82 (FIG. 10) to outpulse the data on the PABX station 26. The PBX-MF-Receiver 112 in the LAMA-CO then receives the data and transfers it to the LAMA transverter 117 in 2-out-of-5 code. Hence the transverter 117 receives the actual information on the calling station 26, instead of just the PABX's line equipment location. When the last digit leaves the PBX-MF-Receiver 112, the DTC relay 138 is operated through the closing of the LDRX contacts 139. The DTC1 contacts 140 cause the LDTV relay 125 to be dropped which in turn drops the DRS relay 127. When the DRS relay 127 is dropped, the digit absorber 113 is removed from the circuit and the normal transverter-to-translator connections are returned. At the same time DTC2 contacts 141 drop the STC relay 122 which returns the transverter-to-transverter connector connections. Also the transverter 117 is able to pass on to the recorder and billing equipment 119 (FIG. 10) the same data it would pass on in an ordinary subscriber call.

In an alternative arrangement, not illustrated, it is possible to eliminate the digit absorber 113 at the expense of other hardware changes. This can be obtained if the PBX-ANI class of service, as in the present invention, is arranged to disable the passing of the calling line equipment location information to the transverter 117 and to cause the transverter 117 not to select a translator 118 but to expect the calling station information from the PBX-MF-Receiver 112.

The sequence of the various functions with the present invention in use with a No. 5 Crossbar ANI-LAMA Central Office, both for ground-start and loop-start systems, is very similar to that for an ANI-CAMA Central Office, the differences occurring toward the end of the sequence. In detail the sequence for the ANI-LAMA system is the same as for an ANI-CAMA system up to and including the step of the sender outpulsing the called number to the connecting CO. The sequence then proceeds as follows - there being no variations for ground start or loop start:

the CO sender begins to transfer the called number to the LAMA transverter; battery is reversed at the PBX-CO ring connection at the CO; the PABX station is dropped from the line and PBX-ANI simultaneously inserted into the line; the sender releases itself from the circuit; supervision is put under control of the outgoing trunk and the PBX-MF-Receiver is placed on Tip and Ring at the outgoing trunk; the LAMA transverter passes the calling PABX line location to the translator; the translator transfers the translated information to the digit absorber; the digit absorber activates a request signal for information on the calling station; an Automatic Message Accounting request signal causes battery re-reversal in the CO; the re-reversal of the battery on the Ring in the CO causes the PBX-ANI to MF outpulse the calling station number; completion of MF outpulsing causes the return of the PABX station to the line and the simultaneous removal of the PBX-ANI from the line; the calling digits are received by the LAMA PBX-MF-Receiver; the digits are changed to 2-out-of-5 code and passed to the transverter; the digits are processed and complete the billing; normal call progression then continues.

SF-1 CROSSBAR CO

This form of crossbar switching system is one in which the crossbar switching arrangements are such that the path used on a call is determined by preference chains associated with the switches themselves. A common group of control units, called Decoders, is used to establish routing information based on the dialled digits, and on the class of service. A typical example of such a system is one manufactured by the Northern Electric Company Limited with the trade name SF-1. FIG. 13 is a simplified block circuit diagram of such a system for handling of ordinary subscriber Direct Distance Dialling (DDD).

A calling station 26 is connected via line circuit 150 to originating line group 151. The originating line group 151 comprises line network 152, route network 153, originating junctor 154, and line and route networks 155 and control circuits 156. Originating junctor 154 is connected directly to an originating register link (ORL) 158 and an originating register sender (ORS) decoder connector 157. The originating junctor 154 is also connected indirectly, via the orginating register link (ORL) 158, to the originating register sender (ORS) 159. The ORS 159 is also connected to the ORS decoder connector 157. The ORS decoder connector 157 is connected to decoder 160.

Decoder 160 is connected to an ANI translator 161 via connector 162, and also to the trunk group 163 via trunk group connector 164. Trunk group 163 comprises route network 165, trunk network 166 and route and trunk networks 167 and control circuits 168. Route network 165 is connected to route network 153 via a link grouping bay 169. Trunk network 166 is connected via outgoing trunk 170 to the distant office.

Operation is as follows. When the calling station 26 initiates a call, by lifting the receiver, dial tone is returned to the station in the normal manner, by operation of the line circuit 150, line network control circuit 155, ORS decoder connector 157, decoder 160, ORS 159, ORL 158 and originating junctor 154. The decoder 160 analyses the office code to determine that it is a long distance call. The decoder 160 selects an appropriate outgoing route and instructs the trunk network control circuit 168, of a trunk network which has at least one idle trunk in the selected route to set up the terminating network. The decoder 160 checks hold magnet operation -of the switches- and then sets the ORS 159 to outpulse in the mode associated with the particular route and sets the originating junctor 154 to its transparent state. The decoder 160 then releases all the select magnets, and any common control equipment still in the connection, and then releases itself.

Once set to outpulse, the ORS 159 performs a continuity check of the trunk and also checks that the connection is in the correct condition for outpulsing. For a call requiring ANI, after outpulsing of the called number is completed the ORS 159 reseizes decoder 160, and passes into the decoder the line location of the calling party. The decoder 160 seizes an appropriate ANI translator 161, via connector 162. The decoder passes to the ANI translator the line network, horizontal file and horizontal group location of the calling station. The translator 161, returns the 4-digit directory number to the decoder 160 on a 2-out-of-5 basis. The decoder checks this information, and, if satisfactory, releases the ANI translator 161. The decoder then forwards the same four digits to the ORS 159 and prefixes the appropriate office code and an information digit. The decoder then sets the ORS to outpulse this information in an MF mode and releases itself from the connection. On completion of outpulsing, the ORS 159 passes supervision to the outgoing trunk 170 and releases itself from the connection.

The above system is designed to be compatible with both loop and ground start calls. Thus the proposed PBX-ANI system, in accordance with the present invention, is compatible with the above described crossbar system, subject to some modifications. It will be seen, from the above description, that the identity of an ordinary subscriber station is readily provided. For a CENTREX-type PABX (i.e. each station has its own 7-digit station number) it will be necessary to replace the number of the subscriber station in the system described above, which would represent only the PABX in the system for which the invention is intended, by information concerning the number of the calling PABX station 26. This information is provided by the PBX-ANI.

In a system incorporating the present invention the PABX-station-call will outpulse the same as an ordinary subscriber call up to the point when the ORS 159 outpulses the called number to the CAMA equipment 33 (FIG. 9). At this point, instead of the ORS 159 reseizing the decoder 160 to get the calling number for the ANI translator 161, the ORS 159 must release itself. This function can be one which results from the activation of the PBX-ANI class of service earlier in the call. Provision of a PBX-ANI class of service is one of the required hardware changes. The PBX-ANI will have been prepared when the ORS 159 had outpulsed the called number to the CAMA equipment 33 (FIG. 9), for example Battery had been reversed at the ring in the CO by the DOPC relay 101 as in FIG. 10 and described earlier in relation to an alternative system. The CAMA equipment makes the request for the calling number. The request passes back to the PBX-ANI 27 (FIG. 2) and causes the PBX-ANI to outpulse its information to the CAMA equipment 33 (FIG. 9), also as earlier described. Normal call progression then follows.

The sequence of the various functions with the present invention in use with an SF-1 crossbar ANI-CAMA central office, for both ground start and loop start system is very similar to that for the No. 5 ANI-CAMA central office. The sequence for the SF-1 is the same as the No. 5 system up to and including the step of the station being dropped from the line and PBX-ANI being simultaneously inserted into the line. The sequence then proceeds as follows, there being no variations for ground or loop start: the originating register sender releases itself from the circuit; supervision is put under control of the outgoing trunk; the CAMA equipment sends out a request signal for information on the calling station; the Automatic Message Accounting request signal re-reverses battery on the ring in the CO; the rereversal of battery on the Ring in the CO causes the PBX-ANI to MF outpulse the calling station number; completion of MF outpulsing causes the return of the PABX station to the line and the simultaneous removal of the PBX-ANI from the line; the calling digits are received by the CAMA equipment and are processed to complete the billing; normal call progression then continues.

STEP-BY-STEP CO

The present invention can be used in conjunction with a step-by-step (SXS) system. FIG. 13 is a simplified block diagram of a SXS switching system, modified to incorporate the present invention. Where applicable, the same references have been applied to items common to previously described arrangements.

Operation of the arrangement illustrated in FIG. 13 is as follows. After the directing code is dialled by the PABX station 26, a connection is established in the SXS CO to an ANI outgoing trunk 175 through a linefinder 176, first selector 177 and service code selector 178. Digits of the call number subsequently dialled are received and registered in the CAMA office 33 (FIG. 17). The CAMA equipment 33 returns a start-identification request signal (of the calling number) to the SXS CO. This signal causes the ANI trunk 175 to initiate the identification process to get the information on the calling station 26. The circuit to the ANI trunk 175 in the CO, in addition to Tip and Ring leads also includes sleeve leads, in the known manner.

On receipt of this start-identification signal, the ANI trunk 175 seizes an outpulser 179, part of the identifying equipment, via outpulser connector 180. The outpulser 179 in turn connects to an identifier 181. The identifier 181 causes the ANI trunk 175 to apply a 5,800 Hz tone, which has had a DC level added as one of the PBX-ANI system modifications, from oscillator 182, onto the sleeve lead.

This tone on the sleeve is detected at the PABX trunk's line circuit 183 and initiates a relay function. Line circuit 183 is modified from a normal line circuit by the addition of a tone detector and the relay function. Detection of the tone by the detector results in the actuation of the relay function which in turn causes the removal of the battery and ground which had been extended to the PABX from the ring and tip (e.g. 41 and 42, FIG. 3) respectively in the line circuit 183. The change of status of the ring and tip is felt at the PABX end 25 and signals the PBX-ANI equipment 27 to prepare for outpulsing of the information on the calling station 26. The relay controlling the tip and ring status is held activated for a required period of time. For example, possibly a slow release relay with a set of its own contacts used to deactivate it. After the required period of time (the time for the CO-ANI to perform its modified functions) battery and ground are returned to the ring and tip (41 and 42, FIG. **3*e*) in the line circuit 183. This operation signals the PBX-ANI 27 to outpulse the calling station information which is transmitted directly to the CAMA equipment 33.**

During that period of time when the relay controlling the status of the line circuit ring and tip is operated, (from the point in time when the tone has been sensed at the line circuit 183 and the battery and ground removed; to the point in time when battery and ground are replaced) modifications to the CO-ANI cause it to deviate from its usual operation and accommodate the PBX-ANI functions in the system. The sleeves 185, from the Main Distribution Frame (MDF) 187 to the primary bus 186, of all PABX lines are ganged and terminated at a single point (or series of points) in the primary bus 186 of the CO-ANI identification system. The CO-ANI comprises the Number networks 184 and Identifier 181. Each sleeve 185 is protected from the others in a ganged group by diodes 188. The tone which originates at the ANI trunk 175 has been given a DC level. This allows the diode to pass a full signal (not rectified) from the MDF 187 to the primary number network on the sleeve lead 185, between the MDF 187 and the primary bus 186, which is associated with the PABX line 26 making the call. This same DC voltage will back bias the diodes in the other sleeve leads of the ganged group preventing any signal from being impressed on them and being transmitted back to their respective PABX lines or circuits.

The result is that all the PABX lines whose sleeves 185 are ganged to that crosspoint 190 generate the same four digit numbers in the number network 184 when they initiate a CAMA call. The common four digit number generated (from this point termed the PABX code number, say 9999) is passed through the Identifier 181 to the Outpulser 179. Note that if a series of crosspoints is being used there may be several PABX code numbers, such as 9990 through 9999. The outpulser 179 has been modified so that it will recognize this (or these) four digit PABX Code number(s) as the special PBX-ANI case. i.e. When the Outpulser's register relays have registered 9999, (or in the case of multiple PABX Code numbers, when any number from 9990 through 9999 is registered) the PBX-ANI function in the Outpulser 179 is activated. This causes the PBX-ANI relay, which has been added to the outpulser circuit, to operate. The PBX-ANI functions of the outpulser 179 are:

1. to prevent the outpulser 179 from transmitting the PABX code to the CAMA equipment 33 as it would if the 4-digit number was an ordinary directory number;

2. to cause the outpulser 179 and identifier 181 to be dropped from the connection;

3. to place the connection under the control of the ANI trunk 175 and to cut it through so that the connection is complete from the PBX-ANI 27 to the CAMA equipment 33.

FIG. 14 comprises part of the diagram of FIG. 13, showing in more detail the connection of the ganged sleeve leads 185 to the primary bus crosspoint as enclosed in the circle 190 in FIG. 13. The impression of the DC on a diode from the oscillator 182, forward biases that diode while back biasing the others, and allows a full sine wave to cross the diode 188 to the number network bus crosspoint encircled at 190. At the same time the back biased diodes prevent any signal from being impressed on the other sleeves. A capacitor 191 prevents the added DC from entering the bus system but allows the required tone signal to reach the number networks and generate the PABX code number.

The step-by-step sequence of operation of a SXS CO system, incorporating the present invention, is fairly simple, but at certain positions several events take place simultaneously. Also, with a relay being used to control the tip and ring status, this relay must have a particular period of time during which it is activated, during which time certain events take place. For clarity therefore, the step-by-step sequence of functions is illustrated by a sequence diagram, FIG. 15. The sequence of operation is as follows: after lifting receiver - PABX station dials digit 9, 200; the directing code is dialled 201; seven or 10 digits are passed to CAMA 202; start identification signal from CAMA to SXS CO 203; ANI trunk seizes outpulser and identifier 204; identifier causes ANI trunk to apply 5,800 Hz tone on a DC level to the sleeve lead 205; tone detected at line circuit 206; relay function causes battery and ground removal at ring and tip in the CO 207. From this event several steps occur both sequentially and other occur simultaneously, the relay being held activated. This is seen in the FIG. 15, as items 207 to 215. After the relay function 207, the PBX-ANI equipment becomes prepared to outpulse the calling station number, at 208, and simultaneously, in sequence, the PABX code is generated by the identification system, 209; the register relays in the outpulser register the PABX code 210; and PBX-ANI function is activated, 211. Then three events occur together - outpulsing to CAMA is prevented, 212; outpulser and identifier are dropped, 213; and the ANI trunk is cut through 214. As indicated at 215 in FIG. 15 the relay controlling the status of the line circuit tip and ring is held activated over the duration of time required for steps 207 through 212, 213, 214 inclusive to have taken place. Following this the functions are: battery and ground are returned to the ring and tip in the CO, 216; PBX-ANI outpulses the calling station 217; and then normal call progression continues, 218.

What is claimed is:

1. A method of automatically identifying a calling station of a private branch exchange in which each calling station has a unique seven-digit identification number, and using a single line connection, comprising: connecting the calling station to the line connection and transmitting a called number thereover to a central office and simultaneously connecting the calling station to an automatic number identification circuit at the private branch exchange; disconnecting the calling station after transmission of the called number and connecting the automatic number identification circuit to the line connection; transmitting the calling station identification over said line connection and disconnecting the number identification circuit from the line connection after transmission of the calling station identification and reconnecting the calling station to the line connection.

2. The method of claim 1 including storing the identification of the calling station in the identification circuit while the calling station is connected to the line connection and outpulsing the calling number identification when the identification circuit is connected to the line connection.

3. The method of claim 2 including transmitting a request signal from accounting equipment at the central office on connection of the identification circuit to the line connection, said request signal initiating the outpulsing of the calling station identification.

4. Apparatus for private branch exchange automatic number identification of a calling station for use with a single line connection, comprising: an automatic number identification circuit at a private branch exchange, said circuit including means for transmitting a signal for identifying the calling station; means for connecting the calling station to the single line connection for transmission of a called number to a central office; means for disconnecting the calling station from the line after transmission of the called number to the central office; means for connecting the number identification circuit to the line for transmission of said signal to identify the calling number to accounting equipment at the central office; and means for disconnecting the number identification circuit from the line after transmission of the identified calling number and for reconnecting the private branch exchange station to the line for normal call progression.

5. Apparatus as claimed in claim 4, said automatic number identification circuit comprising means for storing the calling station identification and means for outpulsing the stored identification on receipt of a request signal from the accounting equipment.

6. Apparatus as claimed in claim 5, said means for storing the calling station identification comprising a permanent store for storing digits common to all stations of the exchange and means for storing the remaining digits of a calling station.

* * * * *